(12) United States Patent
Hung

(10) Patent No.: US 10,785,697 B2
(45) Date of Patent: Sep. 22, 2020

(54) SYSTEMS AND METHODS FOR ESTABLISHING AND MANAGING COMMUNICATION IN A MOBILE AD-HOC NETWORK

(71) Applicant: THE AEROSPACE CORPORATION, El Segundo, CA (US)

(72) Inventor: George W. Hung, Laguna Hills, CA (US)

(73) Assignee: The Aerospace Corporation, El Segundo, CA (US)

( * ) Notice: Subject to any disclaimer, the term of this patent is extended or adjusted under 35 U.S.C. 154(b) by 30 days.

(21) Appl. No.: 16/044,165

(22) Filed: Jul. 24, 2018

(65) Prior Publication Data

US 2020/0037225 A1 Jan. 30, 2020

(51) Int. Cl.
*H04W 40/04* (2009.01)
*H04W 40/20* (2009.01)
*H04L 12/741* (2013.01)
*H04W 84/18* (2009.01)

(52) U.S. Cl.
CPC ............ *H04W 40/04* (2013.01); *H04L 45/54* (2013.01); *H04W 40/20* (2013.01); *H04W 84/18* (2013.01)

(58) Field of Classification Search
CPC ..... H04W 40/04; H04W 40/20; H04W 84/18; H04L 45/54
See application file for complete search history.

(56) References Cited

U.S. PATENT DOCUMENTS

2004/0028018 A1* 2/2004 Cain .................... H04B 7/2643
370/338
2004/0233881 A1* 11/2004 Kang .................... H04L 45/00
370/338

(Continued)

OTHER PUBLICATIONS

Yu et al., Wireless SDN Mobile Ad Hoc Network: from Theory to Practice, IEEE ICC 2017 Communications QoS, Reliability, and Modeling Symposium. (Year: 2017).*

(Continued)

*Primary Examiner* — Shailendra Kumar
(74) *Attorney, Agent, or Firm* — One LLP; Young Tang

(57) ABSTRACT

In conventional MANETs, the functions of network discovery, route generation, and packets forwarding are performed at each node of the network. As a result, achieving routing convergence between all of the devices can be very time and resource intensive as no single node has a complete topology of the network. In contrast, the disclosed MANET with SDN architecture performs network discovery and route generation at centralized location, and packets forwarding is done separately at the node level. This new architecture allows the disclosed MANET to quickly adjust network operating characteristics whenever there is a change in the network topology. Additionally, since all network discovery and routing determination are performed centrally at a single controller, the disclosed MANET can generate a complete topology of the network and as such can perform channel provisioning between all devices such that co-channel interference, transmission delay, inefficient bandwidth allocation, and excessive retransmission are substantially reduced.

18 Claims, 8 Drawing Sheets

(56) References Cited

U.S. PATENT DOCUMENTS

| | | | |
|---|---|---|---|
| 2007/0110017 A1* | 5/2007 | Fulknier | H04L 45/00 370/338 |
| 2015/0208318 A1* | 7/2015 | Mosko | H04W 40/04 370/310 |
| 2016/0100316 A1* | 4/2016 | Mosko | H04W 16/04 370/254 |
| 2019/0222511 A1* | 7/2019 | Lokman | H04L 41/12 |
| 2019/0357096 A1* | 11/2019 | Warashina | H04W 52/383 |

OTHER PUBLICATIONS

Karaoglu, Cooperative Load Balancing and Dynamic Channel Allocation for Cluster-Based Mobile Ad Hoc Networks, IEEE Transactions on Mobile Computing, vol. 14, No. 5, May 2015. (Year: 2015).*

* cited by examiner

SYSTEMS AND METHODS FOR ESTABLISHING AND MANAGING COMMUNICATION IN A MOBILE AD-HOC NETWORK

FIELD

Various aspects of the disclosure relate to establishing a communication a network, and in one aspect but not by way of limitation, to establishing and managing communication in a mobile ad-hoc network.

BACKGROUND

A mobile ad-hoc network (MANET) is a collection of mobile devices having the capability to communicate with each other to form a mobile network without a centralized administrator such as an access point or a cellular tower. A MANET is a self-organizing and self-repairing network. In a MANET, nodes can move out of range or can experience a failure without substantially affecting the overall performance of the network. When a node failure occurs, the MANET can instantly repair the failed and/or out of range nodes by reorganizing the network to compensate for the failed/missing nodes.

MANETs are becoming more ubiquitous because of their autonomy and robustness. Since MANETs are not fixed-infrastructure networks and do not rely on fixed access points (e.g., base station), data can take many routes to arrive at their destinations. For example, in a centralized network, once a base station fails, devices served by the failed base station will not be able to send and receive data. In MANETs, many routes for data can be generated as needed to compensate for any node failure. For example, if a node fails, another node can be quickly assigned to take place of the failed node. Alternatively, a new route can be quickly determined to circumvent the failed node. Today, MANETs can be found in many applications such as in personal networks (e.g., LAN, PAN, etc.), military applications (e.g., a navy carrier group, tanks, drones, soldiers, etc.), and civil applications (e.g., police, fire, and rescue teams, etc.).

Current MANETs use three types of routing protocols: proactive (table-driven), reactive (demand-driven), and hybrid protocols. Proactive protocols used by MANETs include open shortest path first (OSPF), wireless routing protocol (WRP) and dynamic destination sequenced distance vector (DSDV). Reactive protocols used by MANETs include ad-hoc on-demand distance vector (AODV) and dynamic source routing (DSR). Hybrid protocols that have been implemented on MANETs include zone routing and hazy sighted link state protocols. However, each of the above listed protocols involves complicated channel provisioning schemes that can be inefficient, resources intensive, unreliable, and have high collision probability. Accordingly, what is needed is an improved method and system for establishing a MANET and for managing communication (e.g., routes determination, channel provisioning, etc.) therein.

SUMMARY

Example embodiments of a MANET are disclosed, as are example embodiments of the system and method for establishing and managing the MANET. Certain embodiments of the method for establishing and managing the MANET include: receiving, at a network controller over a first control channel, discovery or service request signals from a first and second mobile devices; and establishing, using the network controller, a network topology of the mobile ad-hoc network by: assigning, over the first control channel, the first and second mobile devices to function as a first and a second node controller of the mobile ad-hoc network, respectively; assigning, over the first control channel, a first data channel between the network controller and the first node controller; and assigning, over the first control channel, a second data channel between the network controller and the second node controller. In some embodiments, the first and second channels can be determined based on device information of the first and second node controllers. The device information can include location information, device identifiers, available resources, etc.

The method for establishing and managing the MANET further includes: receiving, at the network controller, a third discovery or service request signal forwarded by the first node to the network controller (the third service request came from a third mobile device not connected to the ad-hoc communication network); adding the third mobile device to the mobile ad-hoc network by assigning, at the network controller, a third data channel between the first node controller and the third mobile device over a second control channel between the third mobile device and the first node controller; and using the network controller, determining data packets paths over the ad-hoc mobile network based on the established network topology and/or data channels.

In some embodiments, the path of the data packets can also be determined using source and destination addresses of the data packets. The process for determining the data packet paths can include creating a forwarding table and downloading the forwarding table to one or more of the nodes using an OpenFlow protocol.

In some embodiments, the network controller can assign a node controller based on resources information received from the first mobile device. The resources information can be information such as remaining battery life, processing power availability, channels availability, and network visibility information.

The channel profiles of first and second data channels can be selected, by the network controller, based on a number of hops between the first and second node controllers. The channel profiles of first and second data channels can be selected, by the network controller, based on physical distance between the first and second node controllers. The physical distance between the first and second node controllers can be determined by comparing GPS coordinates of the first and second node controllers.

In some embodiments, the frequency profile of the third data channel can be assigned based on one or more other frequency profiles of other channels connecting the first node controller to one or more other mobile devices.

In some embodiments, establishing the control channel between each of the devices in the MANET includes selecting a common in-band channel as the control channel that is restricted for only channel provisioning communication.

In yet another embodiment of the disclosure, a MANET is disclosed. The MANET includes: a mobile network controller; a first mobile node controller coupled to the network controller over a first data channel assigned by the network controller; and a second mobile node controller coupled to the network controller over a second data channel assigned by the network controller. The channel profiles of the first and second data channels can be assigned by the network controller based on characteristics of the first and second node controllers. The MANET further includes a first mobile device communicatively connected to the first node controller over a third data channel assigned by the network controller; and a second unconnected mobile device within communication range of the first node controller and outside of communication range of the network controller. The first node controller can be configured to forward a discovery broadcast signal received from the second unconnected mobile device to the network controller, which is configured to assign a fourth data channel for data transfer between the second mobile device and the first node controller based on a channel profile of the third data channel. In some embodiments, the network controller is configured to determine data packets paths over the ad-hoc mobile network based on data channels assigned using a software defined network (SDN) controller. Alternatively, the data packets routes can be determined based on the source and destination addresses of the data packets using the SDN manager.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

DETAILED DESCRIPTION

Overview

The growth of the wireless industry has been explosive in the last few years and will continue to grow exponentially in the foreseeable future. At the same time, many types of network have been deployed to meet the increased demands for data and particularly for data sharing between mobile devices of a network. One type of network that can facilitate data sharing between mobile devices is a mobile ad-hoc network (MANET). As mentioned, a MANET is a self-organizing network and can be formed without the need for existing infrastructures such as base stations or access points. A MANET can be formed instantaneously using two or more devices anywhere—including isolated regions of the globe where no data infrastructure exists. An example of a MANET is a group of soldiers in an isolate environment or within an unfriendly territory. Another example is a group of ships in the middle of the Pacific Ocean. By forming their own MANET, the soldiers or ships can share critical information (e.g., location, health status, available resources, etc.) with each other without the need of a pre-established physical data infrastructure.

Figure 1:
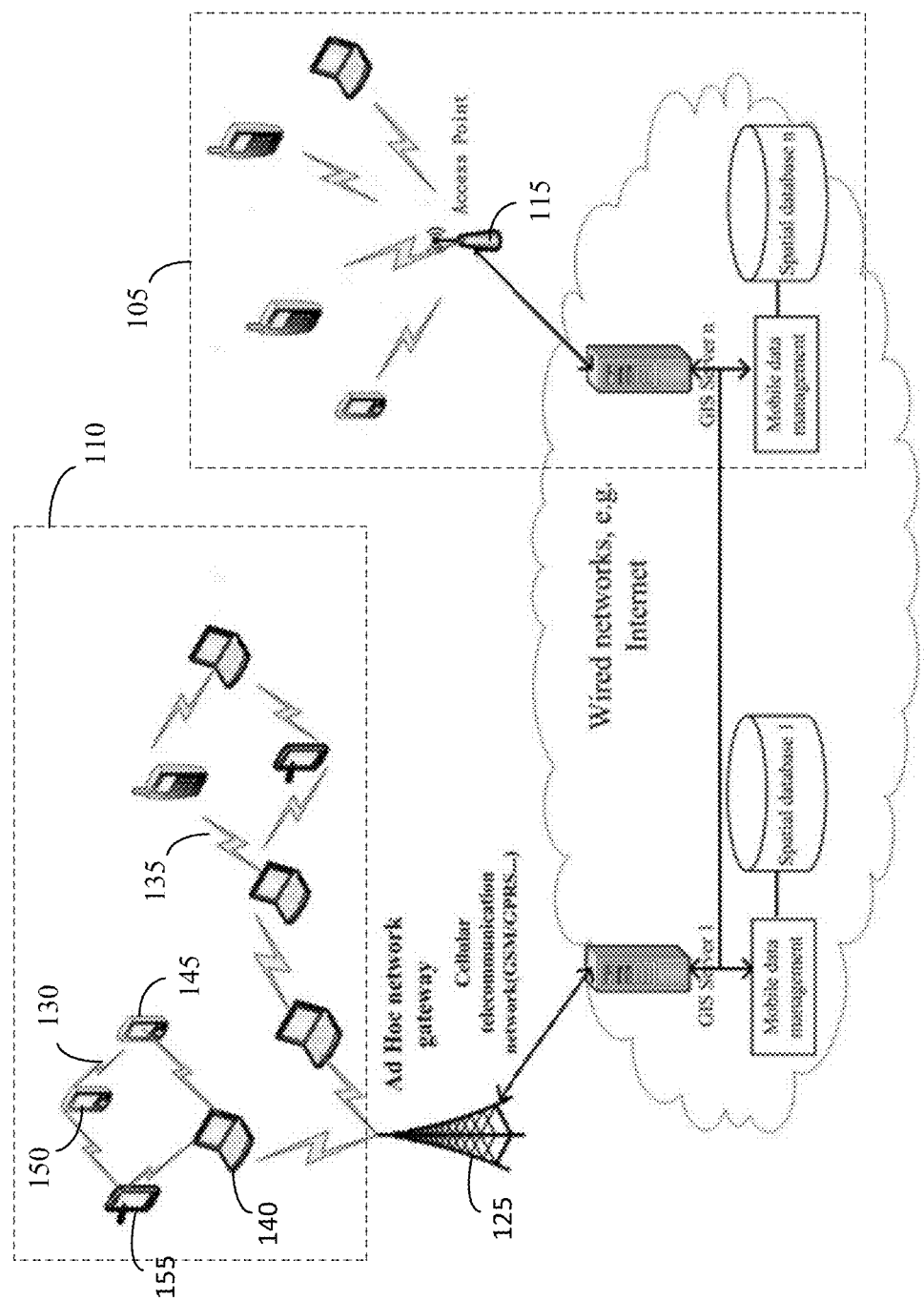
FIG. 1 illustrates an exemplary communication network.

FIG. 1 illustrates an exemplary hybrid network 100 that includes an infrastructure-based network 105 (e.g., LTE network, Wi-Fi network, etc.) and an ad-hoc network 110. Infrastructure-based network 105 can be a local area network (LAN) or a cellular network operating on 3G, 4G, and/or 5G communication protocols. Infrastructure-based network includes an access point 115 that manages and coordinates all uplink and downlink communications. Devices in network 105 cannot directly communicate with each other without going through access point 115. Should access point 115 fail, all devices serviced by network 105 will experience a service interruption. This means all devices within network 105 can no longer communicate with each other or send and receive data.

Ad-hoc network 110 also includes an access point 125. However, devices within network 110 can self-organize and form their own sub-networks 130 and 135. This allows mobile devices within each of the sub-networks 130 and 135 to communicate with each other without having access point 125 be the intermediary. Additionally, devices within each sub-network can still communicate with each other even if access point 125 experiences a failure. The ability to communicate with each other is advantageous because it can substantially reduce traffic through access point 125, which can be a substantial bottleneck during peak times.

In conventional MANETs, each of the devices within the MANET is responsible for network discovery and for negotiating communication channels with adjacent nodes. Each device would broadcast discovery or service request messages and build routing and forwarding tables based on responses received. However, no single device can generate a complete routing table independently. Each of the devices in the network has to communicate with each other using routing protocols to determine the best path to each known destination. The main issue with traditional MANET is the time required to achieve routing convergence between all of the devices in the network. In other words, each device has to agree and converge on the same routing path between any two devices. This process can be extremely time and power intensive as no single node or device has a complete topology of the network.

Route discovery and channel negotiation between mobile devices within sub-network 130 or 135 is conventionally done using a routing protocol such as OSPF, WRP, AODV, or DSR. Whichever protocol is used, routing tables in a conventional MANET are generated locally at each device and each device in the network has to agree and converge on the same routing table. With AODV for example, when a source device does not have a destination device in the routing table, the source device uses AODV protocol to broadcast a route request (RREQ) packet to any device that is listening. If a nearby device receives the RREQ packet and it is not the intended destination device, it rebroadcasts the RREQ packet to devices within its range and updates its own routing table to include the source device. The AODV routing protocol requires devices receiving the RREQ packet to continue rebroadcasting the RREQ packet until the destination device is found or a timed-out occurs, whichever is first.

If a device receives the RREQ packet and it is the intended destination device, it responses by sending a RREP (route reply packet) to the source device through all of the intermediary nodes. Once the source device receives the RREP, it generates a routing path to the destination device by updating the routing table to include all of the intermediary devices in between. Additionally, each intermediary device then updates its routing table to include the source and destination devices and all other intermediary devices in between. As described above, conventional MANETs perform both network discovery and route generation locally at each of the network devices or nodes. Although this process enables the network to be self-organizing and self-correcting, the handshaking, channel provisioning, and route generation process lacks any centralized and global coordination. This can lead to channel co-interference, framing delay, and gross inefficiency.

MANET with SDN Architecture

Figure 2:
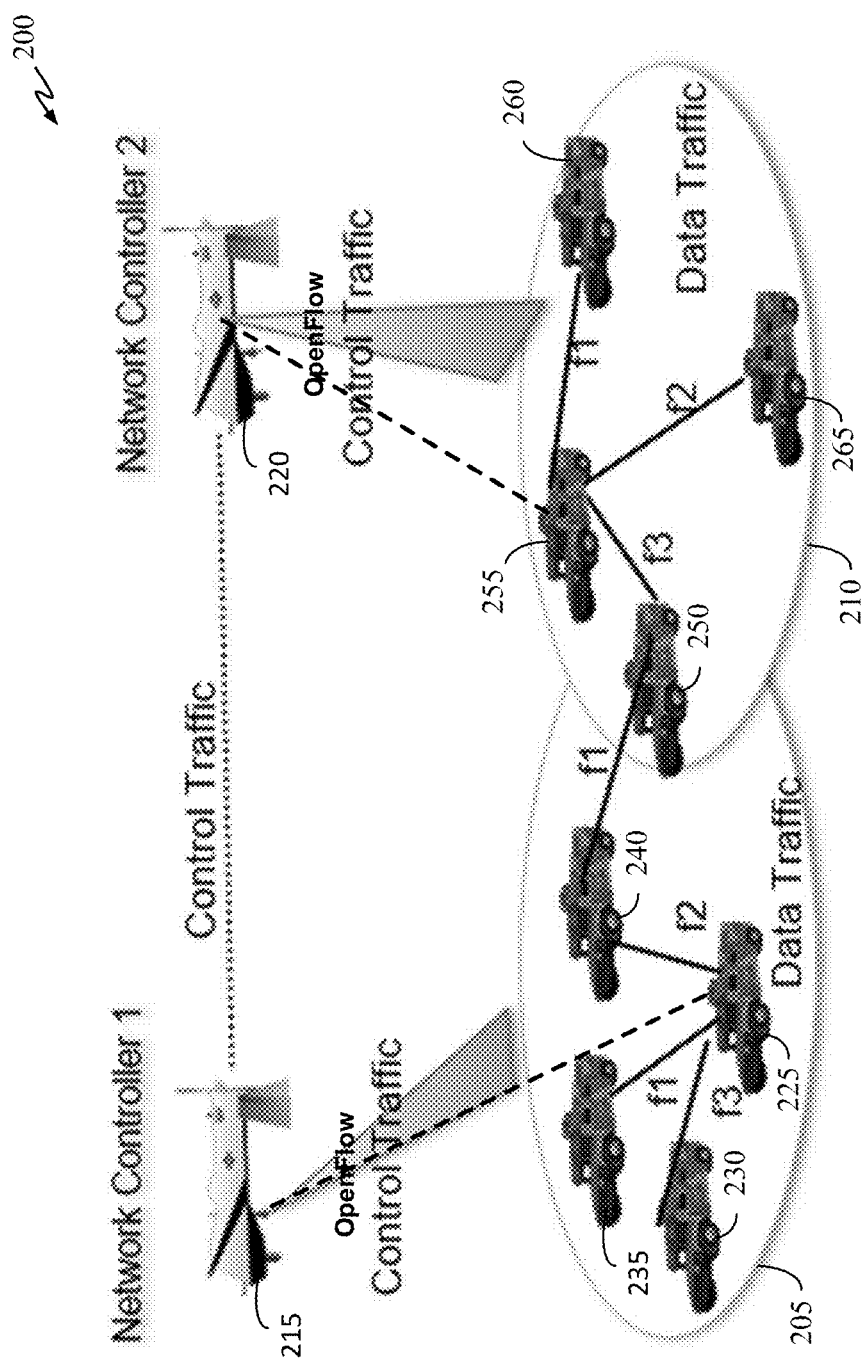
FIG. 2 illustrates an exemplary mobile ad-hoc network in accordance with an aspect of the disclosure.

FIG. 2 illustrates a MANET 200 implemented on a SDN architecture using an OpenFlow protocol in accordance with some embodiments of the present invention. MANET 200 includes two main cells 205 and 210. Each cell can have a least one node controller. MANET 200 can have one or more network controllers. In the embodiment shown, MANET 200 includes network controllers 215 and 220. Network controller 215 is responsible for managing communication between devices in cell 205, and network controller 220 is responsible for managing communication between devices in cell 210. In cell 205, mobile device 225 can be a node controller, which essentially acts as a communication hub or base station for devices 230, 235, 240, and 250. In cell 210, mobile device 255 can act as the node controller for devices 250, 260, and 265. Each mobile device can be a communication device on a soldier, a vehicle, an aircraft, a drone, a helicopter, a ship, etc. A network controller of a network can be any of the devices of a network. For example, in cell 205, mobile device 225 can be the network controller instead of mobile device/drone 215. The network controller of a network can be predetermined based on available resources (e.g., battery, processing power, rank of the user carrying the communication device on which the network controller resides, location, available resources, etc.) In cell 205, drone 215 can be preselected to act as the network controller due to its location and available resources (e.g., higher capacity battery and more powerful antenna). In some embodiments, a network controller can be self-appointed by one of the devices. For example, if mobile device is first on the scene, it can self-point itself to be the network controller.

As an additional example, a soldier has arrived at the way point but cannot locate anyone nearby. The soldier's communication device sends out an encrypted service or discovery request message. After a predetermined amount of time without a response, the soldier's communication device can self-appoint it to be the network controller and will listen on an encrypted common broadcast channel for other devices. As more soldiers arrive, their communication devices will send out discovery request messages once they are activated. The self-appointed network controller can then manage any incoming discovery request messages and can assign one or more of the soldiers' devices to be node controllers based on the received discovery request messages. Each time the network controller (e.g., controller 215 or 220) discovers a device, receives a discovery request forwarded by another device, assigns a device to be a node controller or a non-node device, the network controller can update the routing able. For example, device 255 can forward a discovery request message received from device 265, that is out of communication range with network controller 220, to network controller 220, which can then assign device 255 to be a node controller for at least device 265 based at least on the received discovery request message. Network controller 220 can also instruct device 255 to establish a communication channel with device 265 using a particular channel based at least on the received discovery request message. Once the assignment of a network controller and/or a communication channel is completed, network controller 220 can update the routing table.

In some embodiments, the discovery request message can include device information such as resources availability, location information, status information, known neighboring devices, device identifier, chain of custody information (identifier of all devices that have forward the discovery request message), etc. The discovery request message can be broadcasted on a predetermined encrypted out-of-band channel. Alternatively, the discovery request can be broadcasted on predetermined in-band channel, but with a narrow modulation profile. For example, the predetermined in-band channel can very specific and having a narrow frequency-band such that it would not interfere with other in-band channels operating in MANET 200.

The network controller can also assign communication channels between each node controller and itself based at least on the content of the discovery request message. Further, the network controller can also assign communication channels between node controllers and non-node devices based on the content of the discovery request message. In some embodiments, the network controller can act as a central network administrator, which is responsible for developing the entire network topology based on discovery request messages received from the plurality of devices in the network. In some embodiments, the network controller can perform channel provisioning between itself and a node controller based on the discovery request messages of the node controller and also based on the discovery request message and/or the channel communication profile of another device connected to the network controller. For example, the network controller can be directly connected to a plurality of node controllers and non-node devices. In some embodiment, the network will assign a dedicated communication channel with each of the node controllers and the non-node devices. Each time a communication channel is assigned, the network controller can update its centralized routing table, which ultimately includes information on the entire topology of the network.

The channel profile (FDMA, certain frequency-band within FDMA, TDMA, CDMA, etc.) of each dedicated communication channel can be assigned by the network controller based on the channel profiles of other communication channels directly connected to the network controller. In other words, the network controller will assign communication channels to the plurality of nodes and non-node devices in a way to achieve the least interferences and highest possible signal quality. In this way, co-channel interferences, framing delays, etc., can be substantially reduced and/or eliminated.

In some embodiments, if any device connected to MANET 200 receives a discovery request from a device that is out of communication range with the network controller, the connected device can forward the out-of-range device's discovery request message to the network controller on the control channel or using the communication channel, which is assigned by the network controller. Once the network controller receives the forwarded discovery request (which can take one or more hops to arrive at the network controller), the network controller can add the out-of-range device to the network by assigning the first device that forwarded the discovery request message to be a node that will service the out-of-range device. The network controller can also assign a dedicated communication (data) channel between the new node and the out-of-range device, which is now part of the network. Next, the network controller updates the routing table to include the out-of-range device and the assigned communication channel between the new node and device. In some embodiments, the network can generate a forwarding table from the routing table and can forward the forwarding table to any affected nodes.

For example, as illustrated in FIG. 2, network controller 215 includes node controller 225 and non-node devices 230, 235, 240, and 250. For illustration purposes, non-node devices 230, 235, 240, and 250 can be assumed to be out of direct communication range with network controller 215. However, non-node devices 230, 235, 240, and 250 are all within communication range with node controller 225. Network controller 215 can still develop a complete network topology of MANET 200 by analyzing discovery request messages forwarded to network controller 215 by node controller 225. Based on the received discovery request messages from devices 230, 235, 240, and 250, network controller 215 can instruct device 225 to be the node controller, which will act as a hub for devices 230, 235, 240, and 250. Network controller 215 will also assign appropriate communication channel between node controller 225 and each of the devices 230, 235, 240, and 250. Network controller 215 can also update its routing table accordingly. In some embodiments, each time a device forward a discovery request, the forwarding device can attach its own device identifier to the discovery request message. In this way, a complete chain of custody for any discovery request message can be generated. In some embodiments, using the chain of custody information of discovery request messages, network controller 215 can locally generate the routing table and develop a complete picture of MANET 200 topology.

In some embodiments, network controller 215 can generate a forwarding table for each node controller. Network controller 215 can forward the generated forwarding table to each node controller. One or more node controllers can have the same forwarding table. If the network topology is changed (e.g., a node dropped off), network controller 215 can update the routing table and generate a new forwarding table, which is then forward to the affected node (i.e., the node that went out of service and nodes adjacent to the dead node). For example, if device 225 goes out of communication range with network controller 215 and devices 230, 235, and 240, network controller 215 can generate new routing and forwarding table(s). Network controller 215 then forward the new forwarding table(s) to devices 230, 235, and 240, each of which is affected by the removal of device 225 from the network.

In some embodiments, MANET 200 uses an OpenFlow protocol to establish the communication network (e.g., routes, communication channels between devices) that connect all of the devices within MANET 200. OpenFlow is a software-defined networking (SDN) standard that enables a SDN or OpenFlow controller (e.g., network controller 215) to communicate with and control the forwarding plane of network devices such as switches and routers (in an infrastructure-based network). As mentioned, MANET 200 can have a SDN architecture implemented with an OpenFlow control protocol, which enables each of the mobile devices to function as a forwarding plane and essentially replaces the switches and routers of traditional infrastructure-based and MANET networks.

In traditional infrastructure-based network and traditional MANET network, the control plane and the forward plane both reside on each of the network devices such as a switch or a router. The control plane of a switch, for example, decides how and where to route data packets by generating a routing table and a forwarding table, which is forwarded to the forwarding plane of the switch where the actual data packets are being forwarded based on the forwarding table. Since network devices of a traditional MANET network perform both data and control functions, it is difficult to adjust all of the routing and forwarding tables of all network devices when there is a change in the network topology (e.g., a node failure or outage).

The SDN architecture with OpenFlow is more flexible and nimble than traditional network architecture because it separates the data and control functions of networking devices. SDN allows the network controller (e.g., device/network controller 215) to adjust network operating characteristics (e.g., packets routing paths, communication channels used by each device, etc.) efficiently and quickly at a centralized location. This architecture allows MANET 200 to quickly adjust the network operating characteristics whenever there is a change in the network topology (e.g., one of the nodes moves out of range). Additionally, since MANET 200 centralizes essentially all of the network control functions (e.g., routing and channel provisioning) at a single point (e.g., network controller 215 with SDN controller functionalities), network controller 215 can develop a complete network topology of MANET 200. Having a complete network topology enables network controller 215 to efficiently perform packets routing calculations and channel provisioning between all of the devices in MANET 200. Because network controller 215 can see the entire network topology, channel provisioning can be accomplished between all devices such that co-channel interference, transmission delay, inefficient bandwidth allocation, and excessive retransmission are substantially reduced if not entirely eliminated. These types of problems are prevalent in traditional non-SDN MANETs where the data packets routes and channel provisioning are performed using network control protocol such as OSPF, AODV, or DSR rather than OpenFlow.

With traditional (non-SDN) MANETS, two types of interferences are common as channel provisioning is done locally at each node without any global and centralized coordination. The first common type of interference occurs when a node transmits a signal and receives a signal concurrently on the same channel. This can happen regularly in traditional MANETs because each node in the network is not aware of the channels adjacent nodes are using. The second common type of interference occurs when a node receives more than one signal on the same channel. In MANET 200, network controller 215 can prevent these two common types of interference from occurring by provisioning channels appropriately based on each node information such as location and available resources. Network controller 215 can assign appropriate channels to each node such that there are appropriate co-channel reuse distance and channel separation based on the device information and/or overall network topology (e.g., distances to adjacent nodes, channels used by adjacent nodes, etc.). For example, in MANET 200, network controller 215 can assign channel "f3" as the dedicated communication channel between devices 225 and 230. However, because network controller 215 can generate a complete picture of the network topology, it can assign the same channel "f3" (channel reuse) between devices 250 and 255 because network controller 215 knows that the distance between device 250 and 225 is sufficient great such that no co-channel interference will occur. In some embodiments, the channel assignments or provisioning performed by network control 215 is accomplished using a device & network topology module 605 (see FIG. 6).

Figure 3:
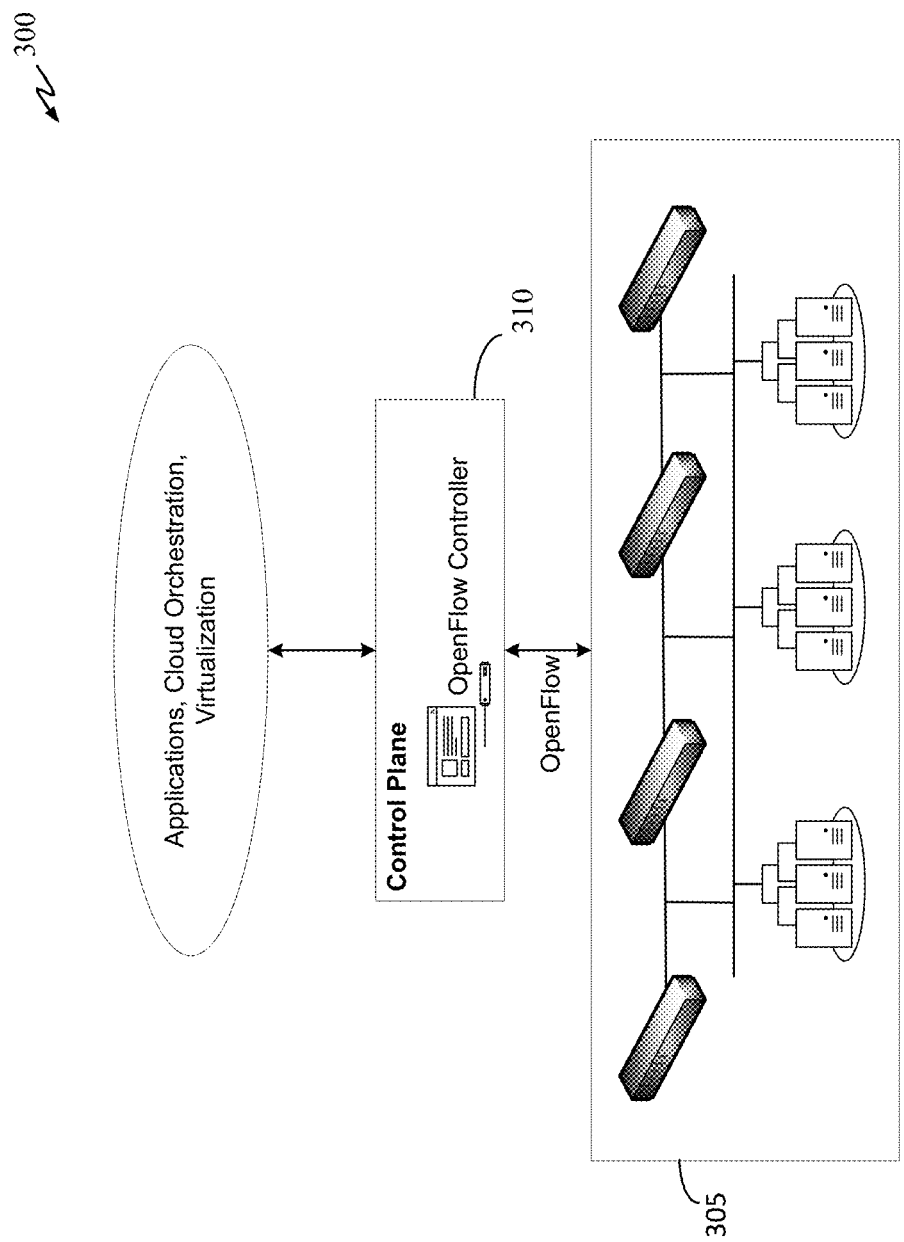
FIG. 3 illustrates an exemplary data center network.

As previously mentioned, MANET 200 can use an OpenFlow protocol to implement the SDN architecture of the network. This particular implementation of SDN and OpenFlow in a MANET has never been attempted. Traditionally, SDN and the OpenFlow protocol has only been used in a data center SDN network 300 as illustrated in FIG. 3. In a data center, the number of network devices 305 can be in the thousands, if not more. As such, it would be extremely time consuming and resource intensive to reconfigure and regenerate the network routing table at each network device whenever there is a change in the network topology. The time it takes to achieve routing path convergence among all of the network devices can be staggering when using routing protocols such as OSPF, WRP, AODV, and DSR, for example. By using the SDN architecture with the OpenFlow protocol, whenever there is a change in the network topology, the network can be reconfigured and routing tables can be recalculated at a centralized point—the SDN and/or OpenFlow controller 310. This enables the recalculation of routing paths to be accomplished efficiently since the OpenFlow controller has a full picture of the network topology and all routing decisions are centrally calculated.

Figure 4A:
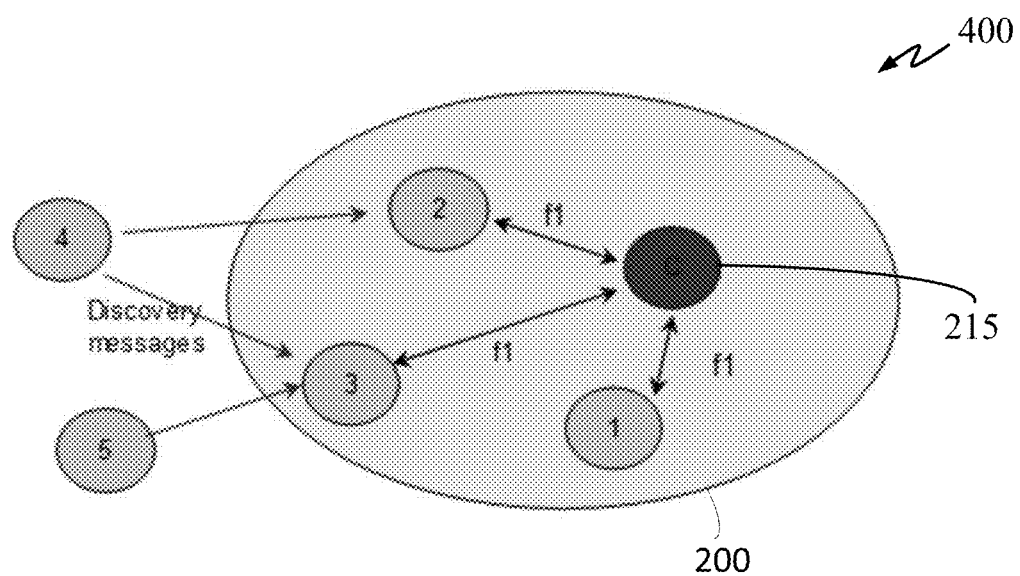
FIGS. 4A-4C are diagrams illustrating a process for establishing a mobile ad-hoc network in accordance with some aspects of the present disclosure.
Figure 4B:
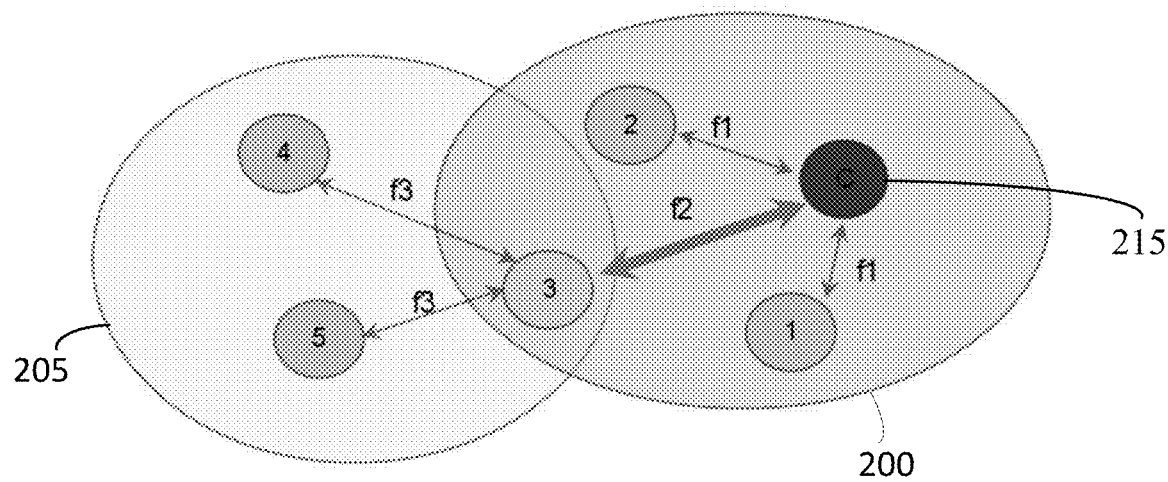

FIGS. 4A and 4B are diagrams illustrating a process 400 for establishing a MANET (e.g., MANET 200) in accordance with some embodiments of the present invention. Process 400 starts when a network controller 215 is assigned. Any device in MANET 200 can be a network controller, which can be predetermined or can be based on the device information (e.g., location, available resources, rank, etc.). In some embodiments, each device in MANET 200 can send out a discovery request message (upon power up) on a predetermined dedicated control channel, which can be a secure and encrypted channel. In some embodiments, network controller 215 of MANET 200 can perform channel provisioning using point-to-point connection between two nodes over a predetermined channel (which is free of interference). Alternatively, network controller 215 can act as a base station using Wi-Fi, LTE, or suitable other communication protocols (e.g., 5G). In this embodiment, all devices in cell 200 can communicate with the base station on the same frequency using multiple access scheme such as TDMA, CDMA, OFDMA, etc. In certain operations when frequency availability is an issue, using multiple access scheme will greatly enhance the frequency reuse capability.

As shown in FIG. 4A, devices 1, 2, and 3 have established a connection with network controller 215. Network controller 215 can assign a dedicated communication channel between each device and itself based on each device information, which can be received along with the discovery request message. In some embodiments, network controller 215 can assign a dedicated communication channel to a device by sending instruction over the control channel, which can be an out-of-band or an in-band channel. In some embodiments, devices 1 and 2 can both operate on the same channel f1 because they are sufficiently far away from each other. Since device 3 is near device 1 or 2, network controller 215 can assign a different communication channel to connect itself and device 3. In this way, co-channel interference is substantially reduced.

For out-of-range devices such as devices 4 and 5, discovery request messages from those devices will be automatically forwarded to controller 215 by devices 2 and 3, respectively. It should be noted that devices 2 and 3 can only forward the received discovery request message and do not make any channel provisioning determination for devices 4 and 5. This function belongs solely to network controller 215. Based on the discovery request messages and/or device information of devices 4 and 5, network controller 215 can assign device 3 to be a node controller for devices 4 and 5. This essential means that device 3 will serve as a base station for devices 4 and 5 over an assigned communication channel (e.g., channel f3).

To put it differently, as node or device 3 informs network controller 215 that devices 4 and 5 want to join the network, network controller 215 can instruct device 3 to turn itself into a base station and set up a cell with frequency f3 for communication with devices 4 and 5. This results in cells 200 and 205 being connected via a dedicated point-to-point link (communication channel) using frequency f2.

Figure 4C:
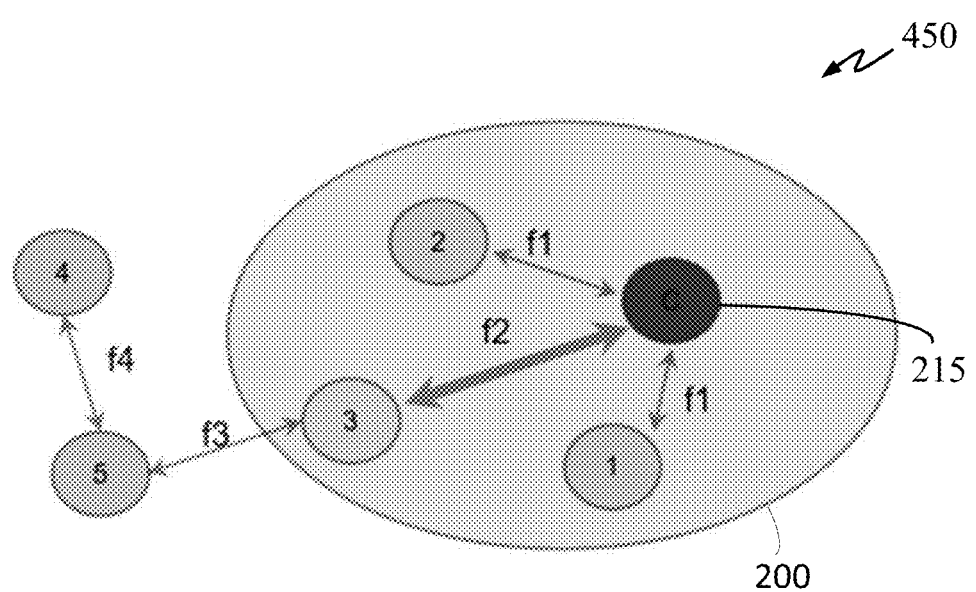

If a node or device in MANET 200 moves out of range of the assigned node controller, the network topology can be reconfigured. FIG. 4C illustrates a process for reconfiguring the network topology in accordance with some embodiments of the present disclosure. Previously, device 3 acts as a base station that serves devices 4 and 5. Device 4 was connected to device 3 on a dedicated channel f3 (see FIG. 4B). For a variety of reasons, this topology can fail or is no longer efficient. In some embodiments, network controller 215 can reconfigure the network into a hybrid topology 450 that includes cell 200 and a point-to-point link. In some embodiments, as network controller 215 recognizes that device 4 is moving far away from device 3 (but still within communication range with device 5), network controller can reconfigure or deconstruct cell 205 (see FIG. 4B) to a point-to-point link between devices 4 and 5. This can be done automatically without any action taken by device 4.

Alternatively, as device 4 loses its connection to device 3, it can send out another discovery request message, which can be received by device 5. Once network controller 215 receives the discovery request message from device 4, which has been forwarded by devices 5 and 3 (in that order), network controller 215 can re-evaluate the device information and reassign a different path for device 4. In this example, network controller 215 assigns a communication channel f4 between devices 4 and 5. In some embodiment, network control 215 can assign a communication channel f3 between devices 4 and 5 if it determines that there is no interference with the same channel f3 between devices 3 and 5.

Once the network topology is fully developed for MANET 200, network controller 215 can use the OpenFlow routing protocol to generate a routing and forwarding table for MANET 200. Network controller 215 can also use the OpenFlow protocol to download the forwarding table to each of the devices. In some embodiments, MANET 200 can also use other routing protocols to distribute the forwarding table to each of the devices in MANET 200. It should be noted that unlike traditional MANETs, MANET 200 first develop a full picture of the network topology using discovery or hello messages while also performing channel provisioning between each of the devices in the network (e.g., between non-node devices to node devices, or node devices to the network controller). Once the network topology is developed and the channel provisioning are completed, MANET 200 can implement a routing protocol such as OpenFlow to distribute the forwarding table to each of the nodes and/or devices.

Figure 5:
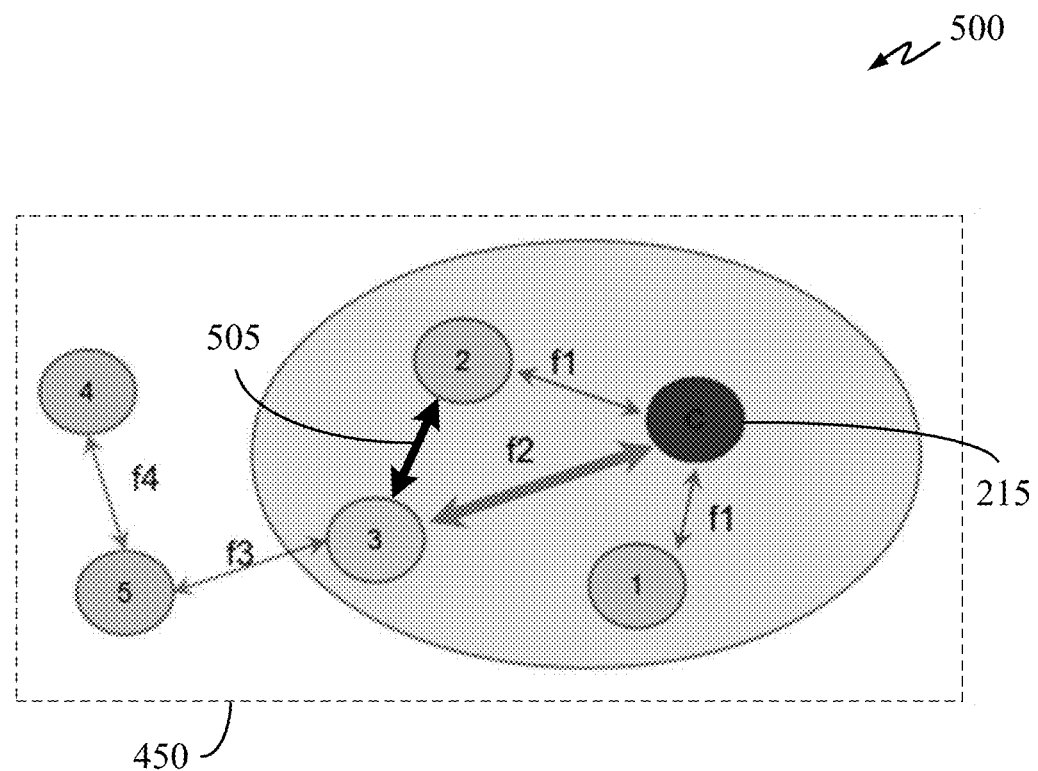
FIG. 5 is a diagram illustrating a process for establishing alternative and/or redundant communication route in accordance with some embodiments of the present disclosure.

FIG. 5 illustrates a process 500 for generating alternative and/or redundant routing path in network 450. In some embodiments, network controller 215 can create an additional communication channel 505 between devices 2 and 3 to achieve load balancing and/or to create a redundant routing path. Although not shown, another dedicated communication path can be assigned by network controller 215 between devices 3 and 4. Further, once network controller 215 determines that device 4 is in range with device 2, network controller 215 can assign another dedicated communication channel between devices 2 and 4.

Figure 6A:
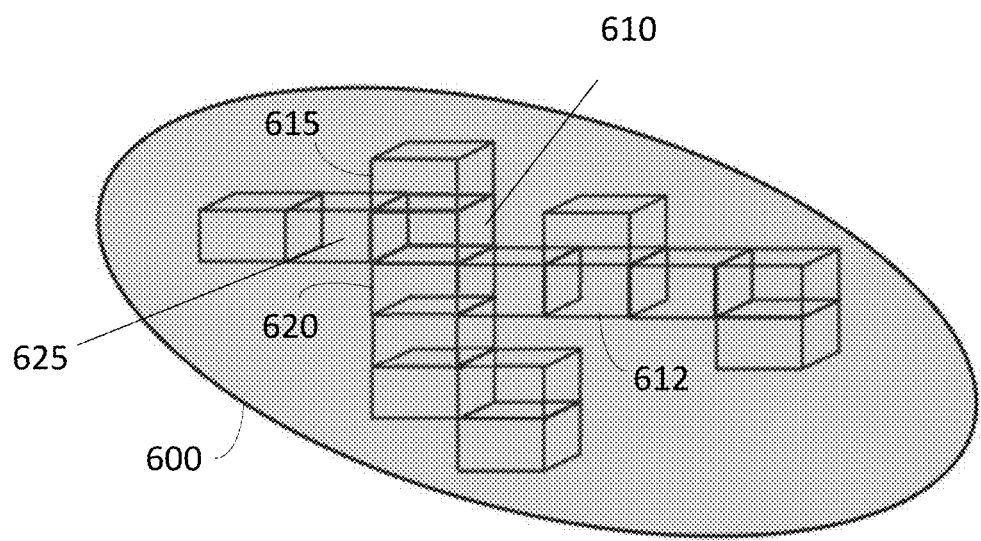
FIGS. 6A-6B illustrate an example hive network in accordance with some embodiments of the present disclosure.
Figure 6B:
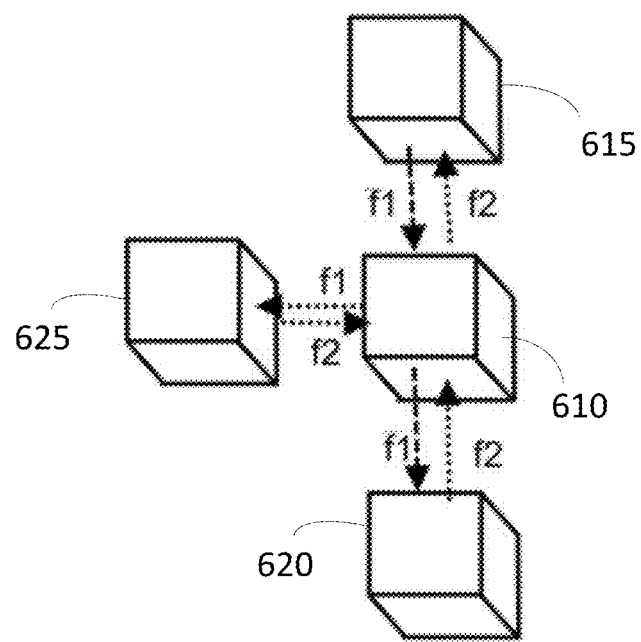

FIG. 6A illustrates an example hive network 600 being implemented on a SDN architecture using an OpenFlow protocol in accordance with some embodiments of the present invention. Similar to conventional MANETs, conventional hive networks use a DSR (dynamic source routing) or AODV (ad-hoc on-demand distance vector) routing algorithm to determine the routing and forward tables. However, as described above, these algorithms are inefficient and energy intensive. Accordingly, in some embodiments, hive network 600 is deployed on a SDN architecture that uses the OpenFlow protocol to determine the routing and forward tables for hive network 600. In hive network 600, one or more hive members can be a hive node or node controller. For example, hive member 610 and 612 can be node controllers, which can be pre-selected or self-assigned based on available resources (e.g., battery capacity, processing, location, etc.). Node controller 610 can also be a network or network controller configured to perform channel provisioning between all hive members within hive network 600. FIG. 6B illustrates a channel provisioning process as assigned by hive network controller 610. Each hive member can have 6 communication interfaces—one for each face of the hive member. Network controller 610 can assign dedicated communication channel(s) between two adjacent faces of two neighboring hive members. For example, as shown in FIG. 6B, the bottom interface of hive member 615 and the top interface of hive member 610 are assigned to dedicated channels f1 and f2—one channel for each upstream and downstream communication. Similarly, the bottom interface of hive member 610 and the top interface of hive member 620 are also assigned to dedicated channels f1 and f2, although other channels can be used. Each time network controller 610 assigns one or more communication channels between two adjacent hive interfaces, network controller 610 can update its centralized routing table. In this way, network controller 610 can develop a routing table that includes information on the entire topology of the network.

Figure 7:
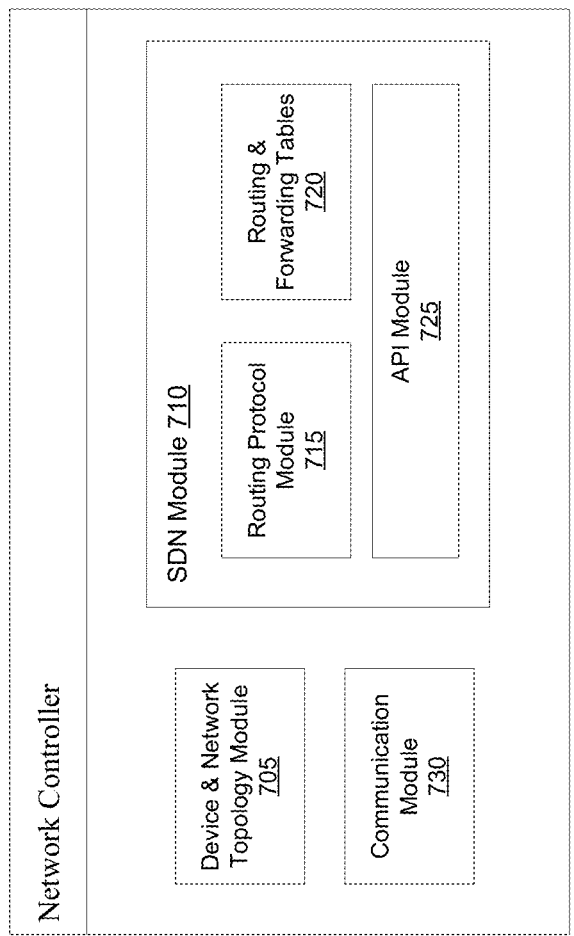
FIG. 7 is a block diagram illustrating software and hardware components of a network controller in accordance with some embodiments of the present disclosure.

FIG. 7 illustrates a system diagram for network controller 215 in accordance with some embodiments of the disclosure. Network controller 215 may include a device and topology module 705, a SDN module 710, and a communication module 730. Each component or module of network controller 215 may communicate with each other and with external entities via communication module 730. Device and topology module 705 contains codes, instructions, and algorithms which when executed by a processor will cause the processor to: manage discovery request messages and develop a network topology based on the received discovery request messages (as described with respect to FIGS. 2, 4A-4C, and 5); and assign one or more dedicated communication channels between devices in the network (also as described with respect to FIGS. 2, 4A-4C, and 5). For example, device and topology module 705 can assign appropriate channels to each node such that there are appropriate co-channel reuse distance and channel separation based on device information (e.g., location, available resources) and/or the overall network topology (e.g., distances to adjacent nodes, channels used by adjacent nodes, etc.). Device and topology module 705 also contains codes, instructions, and algorithms which when executed by a processor will cause the processor to: self-appoint a device to be a network controller, and appoint one or more devices in the network to function as node controllers.

SDN module 710 can contain routing protocol module 715, routing & forwarding tables 720, and API module 725. Routing protocol module 715 can be an OpenFlow routing protocol (as used by process 400) or other type of protocol suitable for downloading forwarding tables to each node of a network. Routing & forwarding tables contain the routing and forwarding data generated by the routing protocol module 715. In some embodiments, routing and forwarding tables 720 can also be part of the routing protocol module. API module 725 provides a communication interface between SDN module 710 and external applications and/or devices such as network controller 215.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The invention claimed is:

1. A method for establishing and managing communication between mobile devices of a mobile ad-hoc network (MANET), the method comprising:
   receiving, at a network controller over a first control channel, service request signals from a first and second mobile devices;
   establishing, using the network controller, a network topology for the MANET by:
      assigning, over the first control channel, the first and second mobile devices to function as a first and a second node controller of the MANET, respectively;
      assigning, over the first control channel, a first data channel between the network controller and the first node controller; and
      assigning, over the first control channel, a second data channel between the network controller and the second node controller, wherein channel frequency profiles of the first and second channels are determined based on a number of hops between the first and second node controllers;
   receiving, at the network controller, a third service request signal forwarded by the first node controller to the network controller, wherein the third service request came from a third mobile device not connected to the MANET;
   adding the third mobile device to the MANET by assigning, at the network controller, a third data channel between the first node controller and the third mobile device over a second control channel between the third mobile device and the first node controller;
   using the network controller, determining data packets paths over the MANET based the established network topology.

2. The method of claim 1, wherein determining the data packet paths comprises:
   at the network controller, creating a forwarding table; and
   at the network controller, downloading the forwarding table to one or more of the nodes using an OpenFlow protocol.

3. The method of claim 1, wherein assigning the first mobile device to function as the first node controller further comprises:
   receiving resources information from the first mobile device;
   determining whether the first mobile device should function as a node controller based on the received resources information.

4. The method of claim 3, wherein the resources information comprises remaining battery life, processing power availability, frequency channel availability, and network visibility information.

5. The method of claim 1, wherein frequency profiles of first and second data channels are based on physical distance between the first and second node controllers.

6. The method of claim 5, wherein the physical distance between the first and second node controllers is determined by comparing GPS coordinates of the first and second node controllers.

7. The method of claim 1, wherein a frequency profile of the third data channel is assigned based on one or more other frequency profiles of other channels connecting the first node controller to one or more other mobile devices.

8. The method of claim 1, wherein the third unconnected mobile device is out of communication range of the network controller, wherein the network controller is a mobile device.

9. The method of claim 1, wherein establishing the control channel comprises selecting a common in-band channel as the control channel, wherein the common in-band channel is restricted for only channel provisioning communication.

10. The method of claim 1, wherein the control channel is a predetermined out-of-band channel.

11. A mobile ad-hoc network comprising:
   a mobile network controller,
   a first mobile node controller coupled to the network controller over a first data channel assigned by the network controller;
   a second mobile node controller coupled to the network controller over a second data channel assigned by the network controller, wherein frequency profiles of the first and second data channels are assigned based on characteristics of the first and second node controllers;
   a first mobile device communicatively connected to the first node controller over a third data channel assigned by the network controller; and
   a second unconnected mobile device within communication range of the first node controller and outside of communication range of the network controller, wherein the first node controller is configured to forward a discovery broadcast signal received from the second unconnected mobile device to the network controller, wherein the network controller is configured to assign a fourth data channel for data transfer between the second mobile device and the first node controller based on a frequency profile of the third data channel;
   wherein the network controller is configured to determine data packets paths over the ad-hoc mobile network based on source and destination addresses of the data packets using a software defined network manager; and
   wherein the assignment of the frequency profiles of first and second data channels based on the characteristics of the first and second node controllers depends on a number of hops between the first and second node controllers.

12. The mobile ad-hoc network of claim 11, wherein the network controller is configured to determine whether the second unconnected mobile device should function as a node controller based on resources information received from the second mobile device.

13. The mobile ad-hoc network of claim 12, wherein the resources information comprises remaining battery life, processing power availability, frequency channel availability, and network visibility information.

14. The mobile ad-hoc network of claim 11, wherein the assignment of the frequency profiles of first and second data channels based on the characteristics of the first and second node controllers depends on locations of the first and second node controllers.

15. The mobile ad-hoc network of claim 14, wherein the location is determined by GPS coordinates received from each controller.

16. The mobile ad-hoc network of claim 11, wherein the network controller and each of the node controllers are configured to communicate with each other on a control channel.

17. The mobile ad-hoc network of claim 16, wherein the control channel is a predetermined out-of-band channel.

18. The mobile ad-hoc network of claim 16, wherein the network controller is configured to create a forwarding table and downloading the forwarding table to one or more of the nodes using OpenFlow protocol.

\* \* \* \* \*